United States Patent
Choi et al.

(10) Patent No.: US 10,892,471 B2
(45) Date of Patent: Jan. 12, 2021

(54) METHODS OF PREPARING POSITIVE ELECTRODE ACTIVE MATERIAL PRECURSOR FOR LITHIUM SECONDARY BATTERY AND POSITIVE ELECTRODE ACTIVE MATERIAL

(71) Applicant: LG Chem, Ltd., Seoul (KR)

(72) Inventors: Sang Soon Choi, Daejeon (KR); Hyun Ah Park, Daejeon (KR); Won Sig Jung, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/333,378

(22) PCT Filed: Feb. 6, 2018

(86) PCT No.: PCT/KR2018/001607
§ 371 (c)(1),
(2) Date: Mar. 14, 2019

(87) PCT Pub. No.: WO2018/143783
PCT Pub. Date: Aug. 9, 2018

(65) Prior Publication Data
US 2019/0214628 A1    Jul. 11, 2019

(30) Foreign Application Priority Data

Feb. 6, 2017    (KR) .................. 10-2017-0016346
Feb. 5, 2018    (KR) .................. 10-2018-0014230

(51) Int. Cl.
*H01M 4/04*    (2006.01)
*C01G 53/00*    (2006.01)
(Continued)

(52) U.S. Cl.
CPC .......... *H01M 4/0471* (2013.01); *C01G 53/00* (2013.01); *C01G 53/006* (2013.01); *C01G 53/50* (2013.01);
(Continued)

(58) Field of Classification Search
CPC .......... H01M 4/0471; H01M 10/0525; H01M 4/505; H01M 4/525; H01M 2004/028;
(Continued)

(56) References Cited

U.S. PATENT DOCUMENTS

2013/0183583 A1    7/2013   Kim et al.
2013/0202966 A1    8/2013   Yu et al.
(Continued)

FOREIGN PATENT DOCUMENTS

JP    2016138024 A    8/2016
KR    20110083383 A   7/2011
(Continued)

OTHER PUBLICATIONS

International Search Report for Application No. PCT/KR2018/001607 dated May 11, 2018.

*Primary Examiner* — Andrew J. Oyer
(74) *Attorney, Agent, or Firm* — Lerner, David, Littenberg, Krumholz & Mentlik, LLP (57) ABSTRACT

A method of preparing a positive electrode active material precursor for a lithium secondary battery by using a batch-type reactor, which includes the steps of 1) forming positive electrode active material precursor particles while continuously adding a transition metal-containing solution including a transition metal cation, an aqueous alkaline solution, and an ammonium ion-containing solution to a batch-type reactor, 2) sedimenting the positive electrode active material precursor particles formed; 3) discharging a supernatant formed after the sedimentation of the positive electrode
(Continued)

active material precursor particles to an outside; 4) adjusting a pH to 10 to 12 by adding the ammonium ion-containing solution; and 5) growing the positive electrode active material precursor particles while continuously again adding the transition metal-containing solution to the batch-type reactor, and a method of preparing a positive electrode active material using the same.

15 Claims, 3 Drawing Sheets

(51) Int. Cl.
*H01M 10/0525* (2010.01)
*H01M 4/505* (2010.01)
*H01M 4/02* (2006.01)
*H01M 4/525* (2010.01)

(52) U.S. Cl.
CPC ........... *H01M 4/505* (2013.01); *H01M 4/525* (2013.01); *H01M 10/0525* (2013.01); *C01P 2004/51* (2013.01); *C01P 2004/61* (2013.01); *C01P 2006/40* (2013.01); *H01M 2004/028* (2013.01)

(58) Field of Classification Search
CPC ...... C01G 53/50; C01G 53/006; C01G 53/00; C01P 2004/51; C01P 2004/61; C01P 2006/40; Y02E 60/10
See application file for complete search history.

(56) References Cited

U.S. PATENT DOCUMENTS

| | | | |
|---|---|---|---|
| 2013/0288129 A1* | 10/2013 | Toya | H01M 4/505 429/223 |
| 2014/0106228 A1 | 4/2014 | Toya et al. | |
| 2014/0377660 A1 | 12/2014 | Fukui et al. | |

FOREIGN PATENT DOCUMENTS

| | | |
|---|---|---|
| KR | 20130009739 A | 1/2013 |
| KR | 20140008445 A | 1/2014 |
| KR | 20140126302 A | 10/2014 |
| KR | 20150050459 A | 5/2015 |
| KR | 20150075200 A | 7/2015 |
| WO | 2012011785 A2 | 1/2012 |

* cited by examiner

METHODS OF PREPARING POSITIVE ELECTRODE ACTIVE MATERIAL PRECURSOR FOR LITHIUM SECONDARY BATTERY AND POSITIVE ELECTRODE ACTIVE MATERIAL

CROSS-REFERENCE TO RELATED APPLICATIONS

This application claims the benefit of Korean Patent Application Nos. 10-2017-0016346, filed on Feb. 6, 2017, and 10-2018-0014230, filed on Feb. 5, 2018, in the Korean Intellectual Property Office, the disclosure of which is incorporated herein in its entirety by reference.

TECHNICAL FIELD

The present invention relates to methods of preparing a positive electrode active material precursor for a lithium secondary battery and a positive electrode active material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal oxides have been used as a positive electrode active material of the lithium secondary battery, and, among these oxides, a lithium cobalt oxide of $LiCoO_2$ having a high operating voltage and excellent capacity characteristics has been mainly used. However, since the $LiCoO_2$ has very poor thermal properties due to an unstable crystal structure caused by lithium deintercalation and is expensive, there is a limitation in using a large amount of the $LiCoO_2$ as a power source for applications such as electric vehicles.

Lithium manganese oxides ($LiMnO_2$ or $LiMn_2O_4$), lithium iron phosphate compounds ($LiFePO_4$, etc.), or lithium nickel oxides ($LiNiO_2$, etc.) have been developed as materials for replacing the $LiCoO_2$. Among these materials, research and development of the lithium nickel oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery.

Accordingly, as a method to improve low thermal stability while maintaining the excellent reversible capacity of the $LiNiO_2$, $LiNi_{1-\alpha}Co_\alpha O_2$ ($\alpha$=0.1 to 0.3), in which a portion of nickel is substituted with cobalt, or a nickel cobalt manganese-based lithium composite metal oxide (hereinafter, simply referred to as "NCM-based lithium oxide"), in which a portion of nickel is substituted with manganese (Mn) and cobalt (Co), has been developed. Also, in order to address safety issues due to elution of metallic elements while having excellent output characteristics, a lithium transition metal oxide having a concentration gradient of a metal composition has also been proposed.

Typically, a method of preparing the positive electrode active material may include a method of preparing a positive electrode active material precursor using a continuous stirred tank reactor (CSTR) and a method of preparing a positive electrode active material precursor using a batch-type reactor. The continuous stirred tank reactor (CSTR) discharges a precursor composed of particles simultaneously while raw materials are added and co-precipitated, and, with respect to the batch-type reactor, raw materials are added according to a volume of the reactor and reacted for a predetermined time, and a precursor is discharged after the completion of the reaction.

In general, the CSTR method is advantageous in that control of a metal composition ratio is easy, but has limitations in that, since raw material input and product discharge are simultaneously and continuously performed, there may be variations in retention time and reaction time of the positive electrode active materials formed in the reactor and size and composition of the resulting particles may be non-uniform.

Thus, there is a tendency to adopt the batch-type method capable of facilitating particle size control and preparing a positive electrode active material precursor having a uniform particle size, but there is a difficulty in preparing the positive electrode active material precursor having a uniform particle size even if the batch-type reactor is used, and productivity may be significantly reduced in comparison to the CSTR method.

DISCLOSURE OF THE INVENTION

Technical Problem

An aspect of the present invention provides a method capable of facilitating particle size control, preparing a positive electrode active material precursor having a uniform particle size, and significantly increasing productivity in a method of preparing a positive electrode active material precursor for a lithium secondary battery using a batch-type reactor.

Technical Solution

According to an aspect of the present invention, there is provided a method of preparing a positive electrode active material precursor for a lithium secondary battery by using a batch-type reactor which includes the steps of: (1) forming positive electrode active material precursor particles while continuously adding a transition metal-containing solution including a transition metal cation, an aqueous alkaline solution, and an ammonium ion-containing solution to the batch-type reactor; (2) stopping the addition of the solutions when the batch-type reactor is full and sedimenting the positive electrode active material precursor particles formed; (3) discharging a supernatant formed after the sedimentation of the positive electrode active material precursor particles to an outside; (4) adjusting a pH, which has been reduced in the discharging of the supernatant, to 10 to 12 by adding the ammonium ion-containing solution; and (5) growing the positive electrode active material precursor particles while continuously again adding the transition metal-containing solution including a transition metal cation, the aqueous alkaline solution, and the ammonium ion-containing solution to the batch-type reactor.

According to another aspect of the present invention, there is provided a method of preparing a positive electrode active material for a lithium secondary battery which includes sintering after mixing the positive electrode active material precursor with a lithium-containing raw material.

Advantageous Effects

According to the present invention, particle size control is easier than a case where a conventional batch-type method is used, a positive electrode active material precursor for a lithium secondary battery having a uniform particle size may be prepared, and a low productivity problem, a disadvantage of the conventional batch-type method, is solved. Thus, productivity of a positive electrode active material may be significantly increased.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A method of preparing a positive electrode active material precursor for a lithium secondary battery of the present invention uses a batch-type reactor, wherein the method includes the steps of: 1) forming positive electrode active material precursor particles while continuously adding a transition metal-containing solution including a transition metal cation, an aqueous alkaline solution, and an ammonium ion-containing solution to a batch-type reactor; 2) stopping the addition of the solutions when the batch-type reactor is full and sedimenting the positive electrode active material precursor particles formed; 3) discharging a supernatant formed after the sedimentation of the positive electrode active material precursor particles to an outside; 4) adjusting a pH, which has been reduced in the discharging of the supernatant, to 10 to 12 by adding the ammonium ion-containing solution; and 5) growing the positive electrode active material precursor particles while continuously again adding the transition metal-containing solution including a transition metal cation, the aqueous alkaline solution, and the ammonium ion-containing solution to the batch-type reactor.

Hereinafter, each step will be described in more detail.

First, in step 1) for preparing a positive electrode active material precursor, positive electrode active material precursor particles are formed while continuously adding a transition metal-containing solution including a transition metal cation, an aqueous alkaline solution, and an ammonium ion-containing solution to a batch-type reactor.

Figure 1A:
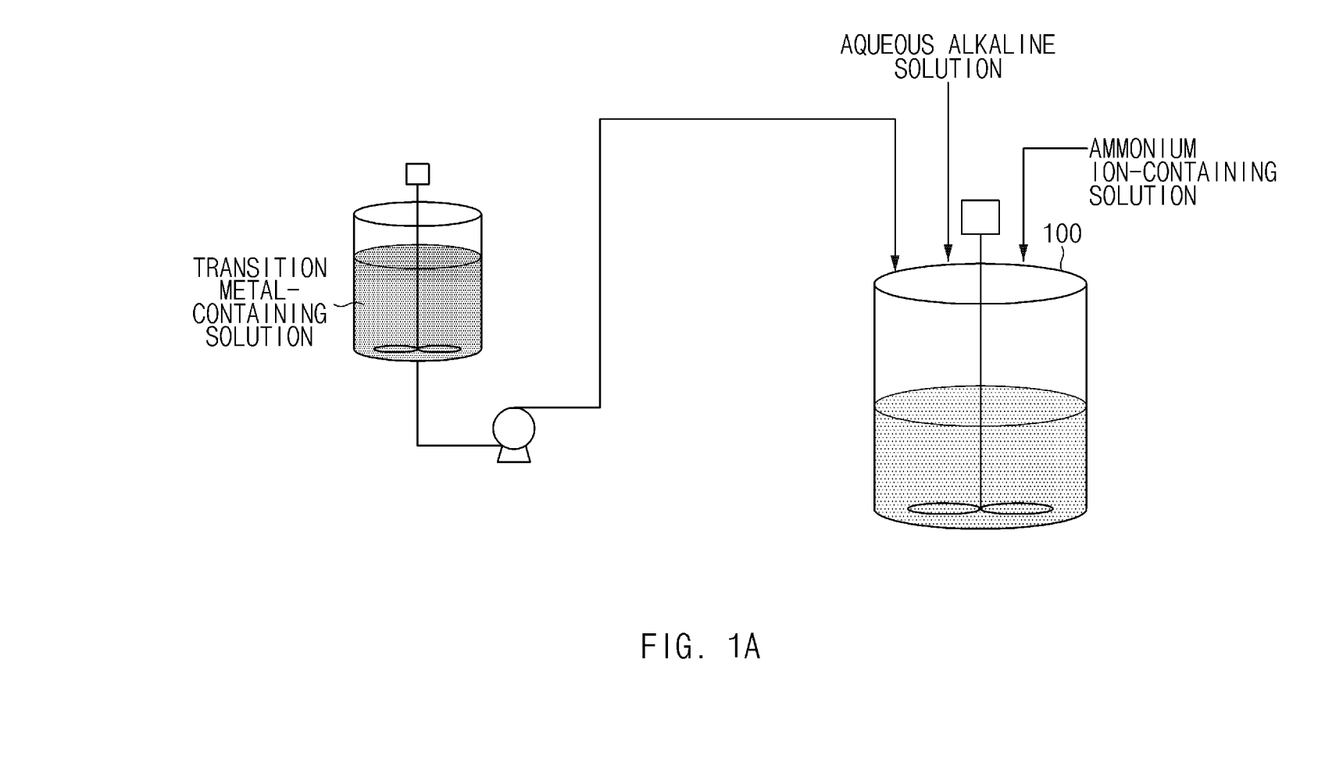
FIGS. 1A, 1B, and 2 schematically illustrate a method of preparing a positive electrode active material precursor according to an embodiment of the preset invention.
Figure 2:
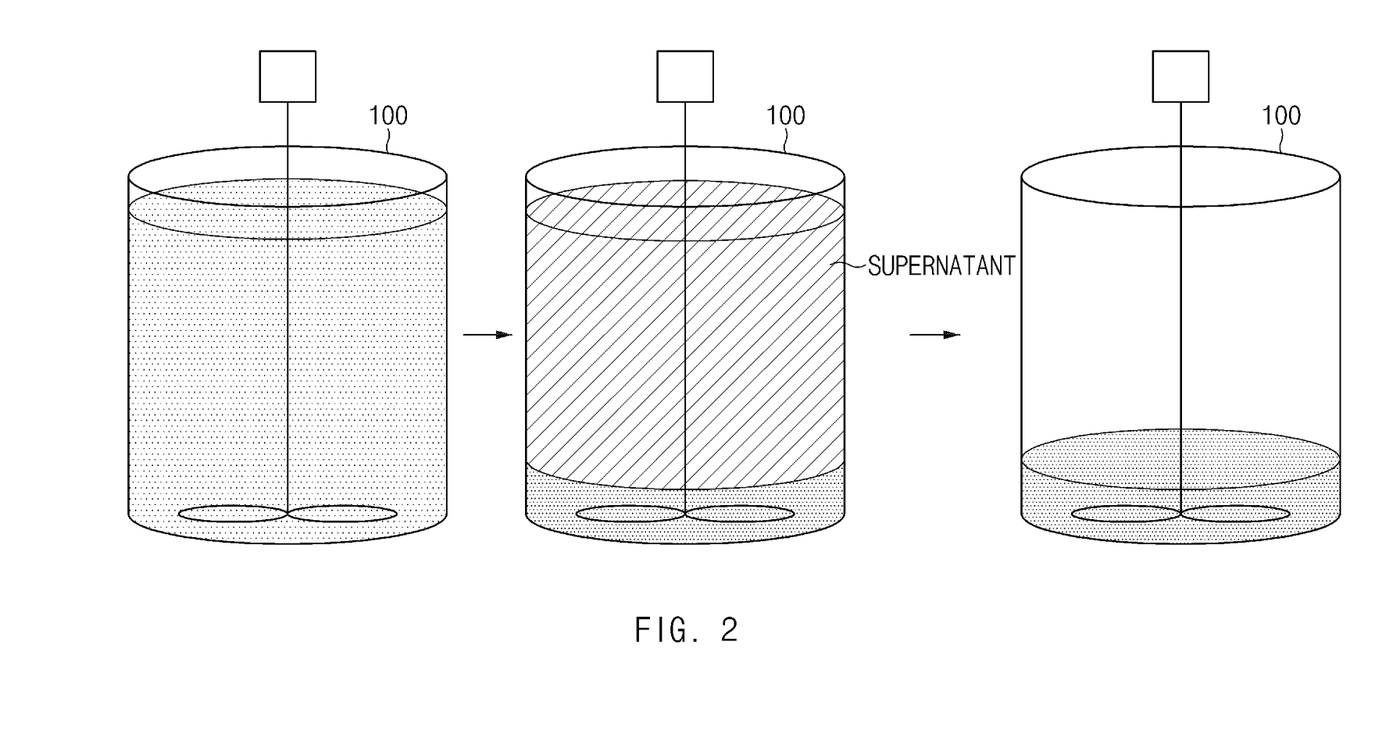

FIGS. 1A and 2 schematically illustrate a method of preparing a positive electrode active material precursor according to an embodiment of the preset invention.

Referring to FIG. 1A, a transition metal-containing solution, an aqueous alkaline solution, and an ammonium ion-containing solution are continuously added to a batch-type reactor 100. Before the continuous addition of the transition metal-containing solution, the aqueous alkaline solution, and the ammonium ion-containing solution, a pH value may be adjusted by first adding the aqueous alkaline solution and the aqueous ammonium solution to a predetermined volume of the batch-type reactor 100.

In the present invention, since the positive electrode active material precursor is prepared by using the batch-type reactor, reaction conditions, such as concentrations, temperature, and retention time of reactants in the reactor, are the same as those of a continuous stirred tank reactor (CSTR), and thus, a relatively uniform product may be prepared.

The transition metal-containing solution may include a cation of at least one transition metal selected from the group consisting of nickel (Ni), manganese (Mn), and cobalt (Co), and for example, may include cations of two or more transition metals.

The transition metal-containing solution may include acetic acid salts, nitrates, sulfates, halides, sulfides, hydroxides, oxides, or oxyhydroxides of the above transition metals, and these materials are not particularly limited as long as they may be dissolved in water.

For example, the cobalt (Co) may be included as $Co(OH)_2$, $CoOOH$, $Co(OCOCH_3)_2 \cdot 4H_2O$, $Co(NO_3)_2 \cdot 6H_2O$, $CoSO_4$, or $Co(SO_4)_2 \cdot 7H_2O$, and any one thereof or a mixture of two or more thereof may be used.

Also, the nickel (Ni) may be included as $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, or a nickel halide, and any one thereof or a mixture of two or more thereof may be used.

Furthermore, the manganese (Mn) may be included as a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; an oxyhydroxide, and manganese chloride, and any one thereof or a mixture of two or more thereof may be used.

Also, in a case in which the finally prepared precursor further includes another metallic element (M) in addition to the nickel (Ni), manganese (Mn), and cobalt (Co) (for example, M includes at least one element selected from the group consisting of tungsten (W), molybdenum (Mo), chromium (Cr), aluminum (Al), zirconium (Zr), titanium (Ti), magnesium (Mg), tantalum (Ta), and niobium (Nb)), a metallic element (M)-containing raw material may be selectively further added during the preparation of the transition metal-containing solution.

The metallic element (M)-containing raw material may include an acetic acid salt, nitrate, sulfate, halide, sulfide, hydroxide, oxide, or oxyhydroxide containing the metallic element (M), and one thereof may be used alone or a mixture of two or more thereof may be used. For example, in a case in which the M is W, tungsten oxide may be used.

The aqueous alkaline solution may include at least one selected from the group consisting of a hydrate of an alkali metal, a hydroxide of an alkali metal, a hydrate of an alkaline earth metal, and a hydroxide of an alkaline earth metal. For example, the aqueous alkaline solution may include NaOH, KOH, or $Ca(OH)_2$, and water or a mixture of water and an organic solvent (specifically, alcohol etc.), which may be uniformly mixed with the water, may be used as a solvent. In this case, a concentration of the aqueous alkaline solution may be in a range of 2 M to 10 M. In a case in which the concentration of the aqueous alkaline solution is less than 2 M, particle formation time may be increased, tap density may be reduced, and yield of a co-precipitated product may be lowered. In a case in which the concentration of the aqueous alkaline solution is greater than 10 M, since the particles rapidly grow due to a rapid reaction, the formation of uniform particles may be difficult and the tap density may also be reduced.

The ammonium ion-containing solution may include at least one selected from the group consisting of $NH_4OH$, $(NH_4)_2SO_4$, $NH_4NO_3$, $NH_4Cl$, $CH_3COONH_4$, and $NH_4CO_3$. Water or a mixture of water and an organic solvent (specifically, alcohol etc.), which may be uniformly mixed with the water, may be used as a solvent.

The forming of the positive electrode active material precursor particles in step 1) may be performed by including the steps of: a) forming particle nucleus through a co-precipitation reaction at a pH of 11 to 13 by adjusting amounts of the aqueous alkaline solution and ammonium ion-containing solution added, and b) after the forming of the nucleus, growing the particles through a co-precipitation reaction at a pH of 8 to 12 by adjusting amounts of the aqueous alkaline solution and ammonium ion-containing solution added.

In other words, in the beginning of the reaction, the aqueous alkaline solution and ammonium ion-containing solution are first added to adjust a pH to 11 to 13, and, thereafter, particle nucleus may be formed while adding the transition metal-containing solution into the reactor. In this case, since the pH value changes as the particle nucleus are formed by the addition of the transition metal-containing solution, the pH value may be controlled to be maintained at 11 to 13 by continuously adding the aqueous alkaline solution and the ammonium ion-containing solution along with the addition of the transition metal-containing solution. If the pH value satisfies the above range, the particle nucleus may be preferentially formed, and the growth of the particles may hardly occur.

After the formation of the particle nucleus is completed, the amounts of the aqueous alkaline solution and ammonium ion-containing solution added are adjusted to control the pH value to be in a range of 8 to 12, and the formed particle nucleus may be grown while adding the transition metal-containing solution. Similarly, in this case, since the pH value changes as the particle nucleus are grown by the addition of the transition metal-containing solution, the pH value may be controlled to be maintained at 8 to 12 by continuously adding the aqueous alkaline solution and the ammonium ion-containing solution along with the addition of the transition metal-containing solution. If the pH value satisfies the above range, new particle nucleus may be hardly formed, and the growth of the particles may preferentially occur.

Addition rates of the transition metal-containing solution, the aqueous alkaline solution, and the ammonium ion-containing solution in step 1) may satisfy the following Equation 1.

$$2(V-v)/t \leq v_1+v_2+v_3 \leq 30(V-v)/t \quad \text{[Equation 1]}$$

In Equation 1, V is a volume (mL) of the batch-type reactor, v is a volume (mL) of the solution filled in the batch-type reactor before the continuous addition of the transition metal-containing solution, t is total reaction time (minutes), $v_1$ is an addition rate (mL/min) of the transition metal-containing solution, $v_2$ is an addition rate (mL/min) of the aqueous alkaline solution, and $v_3$ is an addition rate (mL/min) of the ammonium ion-containing solution.

For example, the addition rates may satisfy $2(V-v)/t \leq v_1+v_2+v_3 \leq 10(V-v)/t$.

When the transition metal-containing solution, the aqueous alkaline solution, and the ammonium ion-containing solution are added at flow rates in a range satisfying Equation 1, the reactor may be filled within time which is about 2 to 30 times, for example, about 2 to 10 times faster than time typically required to fill the reactor.

In a case in which the addition rates of the transition metal-containing solution, the aqueous alkaline solution, and the ammonium ion-containing solution are low at less than the range of Equation 1, productivity may be reduced, and, in a case in which the addition rates of the transition metal-containing solution, the aqueous alkaline solution, and the ammonium ion-containing solution are greater than the range of Equation 1, the particle nucleus may not be stably formed and particle size control may be difficult.

For example, in a case in which a 20 L batch-type reactor is used, a conventional addition rate of the transition metal-containing solution is about 5 mL/min, an addition rate of the aqueous alkaline solution is about 1 mL/min, and an addition rate of the ammonium ion-containing solution is about 1 mL/min, but, in an embodiment of the present invention, the addition rate ($v_1$) of the transition metal-containing solution may be in a range of 10 mL/min to 150 mL/min, for example, 15 mL/min to 50 mL/min, the addition rate ($v_2$) of the aqueous alkaline solution may be in a range of 2 mL/min to 30 mL/min, for example, 3 mL/min to 10 mL/min, and the addition rate ($v_3$) of the ammonium ion-containing solution may be in a range of 2 mL/min to 30 mL/min, for example, 3 mL/min to 10 mL/min.

In another embodiment of the present invention, a precursor having a concentration gradient of a transition metal composition in the particle may be prepared by using a first transition metal-containing solution including cations of two or more transition metals and a second transition metal-containing solution including cations of two or more transition metals but having concentrations of the transition metal cations which are different from those of the first transition metal-containing solution, as the transition metal-containing solution.

Figure 1B:
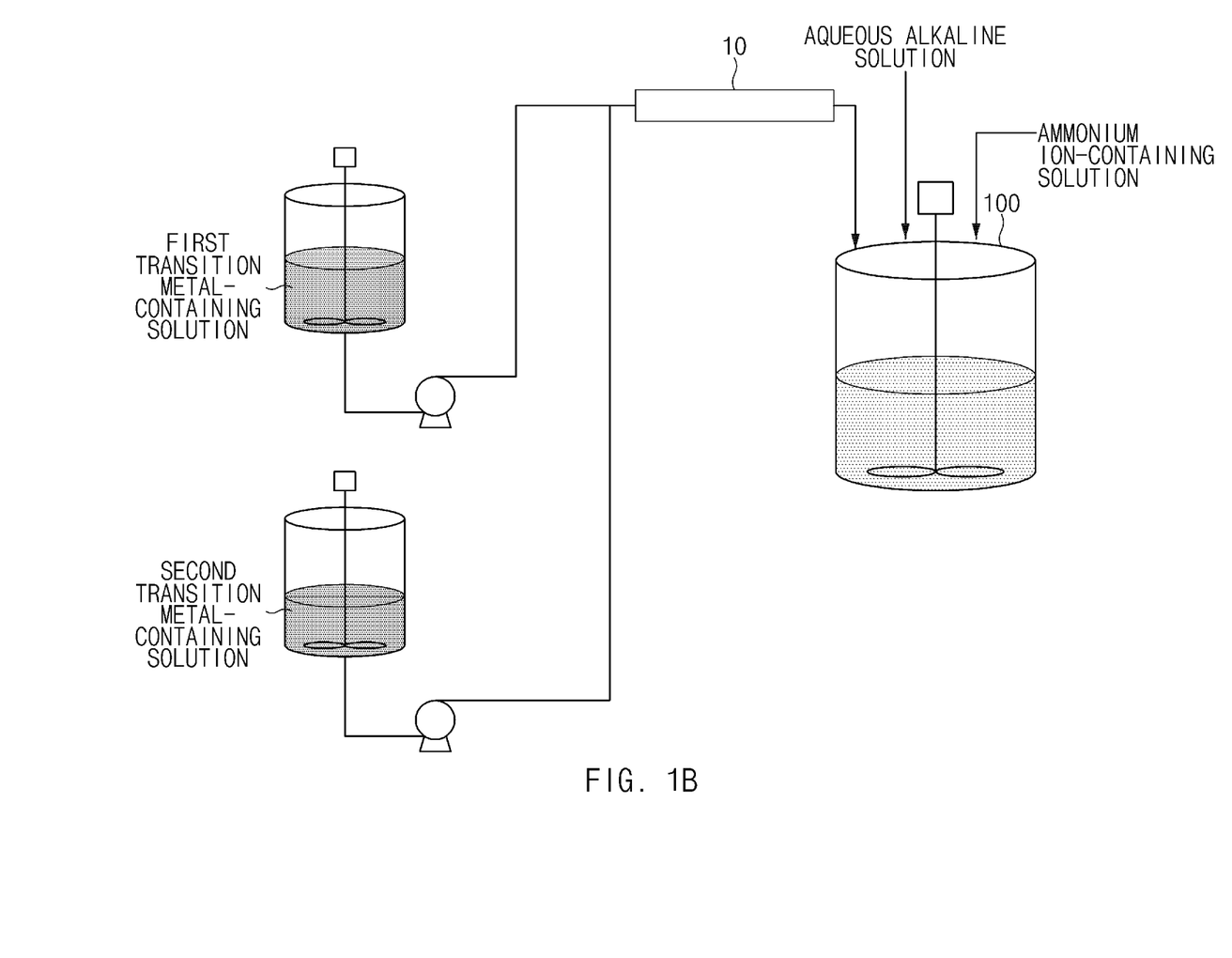

FIG. 1B schematically illustrates a method of preparing a positive electrode active material precursor according to another embodiment of the preset invention.

Referring to FIG. 1B, a first transition metal-containing solution and a second transition metal-containing solution having concentrations of transition metal cations, which are different from those of the first transition metal-containing solution, may be mixed through a mixer 10 to be added to a batch-type reactor 100.

The first and second transition metal-containing solutions may include cations of two or more transition metals, and, for example, may include cations of at least two transition metals selected from the group consisting of nickel (Ni), manganese (Mn), and cobalt (Co).

In this case, the first and second transition metal-containing solutions may have a different concentration of each transition metal cation. Specifically, the first transition metal-containing solution may be a solution in which a concentration of a Ni cation is higher than that of the second transition metal-containing solution. For example, a molar ratio of the Ni salt in the first transition metal-containing solution may be 80% or more based on total transition metal salts, and a molar ratio of the Ni salt in the second transition metal-containing solution may be 70% or less based on the total transition metal salts.

Also, the first transition metal-containing solution may be a solution in which a concentration of cation of at least one transition metal of Mn and Co is lower than that of the second transition metal-containing solution. For example, a molar ratio of the Mn and/or Co salt in the first transition metal-containing solution may be 20% or less based on the total transition metal salts, and a molar ratio of the Mn and/or Co salt in the second transition metal-containing solution may be 30% or more based on the total transition metal salts.

A precursor having a concentration gradient of the transition metal composition in the particle may be prepared by adjusting addition rates of the first transition metal-containing solution and the second transition metal-containing solution in which the concentrations of the transition metal cations are different. For example, the concentration gradient may be formed by gradually decreasing the addition rate of the first transition metal-containing solution and gradually and complementarily increasing the addition rate of the second transition metal-containing solution. Specifically, positive electrode active material precursor particles having a concentration gradient gradually changing from a center of the particle to a surface thereof may be formed by mixing the first transition metal-containing solution and the second transition metal-containing solution such that a mixing ratio of the first transition metal-containing solution to the second transition metal-containing solution is gradually changed from 100 vol %:0 vol % to 0 vol %:100 vol %. In this case, a sum of the addition rates of the first and second transition metal-containing solutions may correspond to the addition rate ($\upsilon_1$) of the transition metal-containing solution in Equation 1.

The first transition metal-containing solution, the second transition metal-containing solution, the ammonium ion-containing solution, and the aqueous alkaline solution may be each independently added to the reactor or may be added to the reactor after some solutions or all solutions are premixed before adding to the reactor. For example, the reaction solutions may be added in such a manner that the first transition metal-containing solution and the second transition metal-containing solution are added to the reactor after mixing the first transition metal-containing solution and the second transition metal-containing solution by using a static mixer, and the ammonium ion-containing solution and the aqueous alkaline solution are directly added to the reactor.

In a case in which the precursor having a concentration gradient is prepared according to the another embodiment of the present invention as described above, a pH in the batch-type reactor may be controlled by the composition of Ni included in the transition metal-containing solution added into the reactor or a flow of the aqueous alkaline solution.

For example, a mixed solution, in which the first transition metal-containing solution and the second transition metal-containing solution are mixed through the mixer, is added to the batch-type reactor, and a pH in the batch-type reactor may be controlled by a composition of Ni included in the mixed solution added to the reactor. For example, in a case in which the composition of Ni is in a range of 80 mol % to 99 mol %, for example, 85 mol % to 95 mol %, the pH may be in a range of 11.5 to 12, for example, 11.6 to 11.9, and, in this case, nucleus of the positive electrode active material precursor particles are formed. Also, in a case in which the composition of Ni is in a range of 40 mol % to less than 80 mol %, for example, 60 mol % to 79 mol %, the pH of the reactor is adjusted to 10.5 to 11.5, for example, 11 to 11.4, and, in this case, the particles may grow.

Specifically, the pH in the batch-type reactor satisfies Equation 2 below.

$$pH_0 - ([Ni]_0 - [Ni]_{t1}) \times 0.05 \leq pH_{t1} \leq pH_0 - ([Ni]_0 - [Ni]_{t1}) \times 0.005 \quad \text{[Equation 2]}$$

In Formula 2, $pH_{t1}$ is a pH in the reactor at time t1, $pH_0$ is an initial pH in the reactor, $[Ni]_0$ is a molar concentration of Ni in the transition metal-containing solution initially added, and $[Ni]_{t1}$ is a molar concentration of Ni in the transition metal-containing solution added at time t1.

In Formula 2, the pH at time t1 may be close to $pH_0 - ([Ni]_0 - [Ni]_{t1}) \times 0.02$.

Specifically, the pH in the batch-type reactor may be controlled by an addition flow of the aqueous alkaline solution, and the addition flow of the aqueous alkaline solution satisfies the following Equation 3.

$$\upsilon_{2,0} \times \{1 - (0.01 \times ([Ni]_0 - [Ni]_{t2}))\} \leq \upsilon_{2,t2} < \upsilon_{2,0} \quad \text{[Equation 3]}$$

In Formula 3, $\upsilon_{2,t2}$ is an addition flow of the aqueous alkaline solution at time t2, $\upsilon_{2,0}$ is an initial addition flow of the aqueous alkaline solution, $[Ni]_0$ is a molar concentration of Ni in the transition metal-containing solution initially added, and $[Ni]_{t2}$ is a molar concentration of Ni in the transition metal-containing solution added at time t2.

Since a condition, in which the nucleus of the positive electrode active material precursor are formed, and a condition, in which the nucleus of the positive electrode active material precursor grow, are distinguished by controlling the pH to satisfy Equations 2 and 3, the formation of the nucleus of the positive electrode active material precursor only occurs when the composition of Ni is in a range of 80 mol % to 99 mol %, that is, the pH is in a range of 11.5 to 12, and, thereafter, the growth of the particles only occurs when the composition of Ni is in a range of 40 mol % to less than 80 mol %, that is, the pH is in a range of 10.5 to 11.5. Thus, particle size and shape of the finally obtained positive electrode active material precursor are uniform, a dense positive electrode active material precursor may be prepared, and a precursor having a uniform concentration gradient may be prepared. Also, in a case in which positive electrode active material precursor particles are prepared by changing pH conditions through changes in the composition of Ni as described above, a positive electrode active material precursor having a uniform surface may be obtained without the growth of nanoflakes on the surface of the particle in the particle growth step.

Next, in step 2), the addition of the solutions is stopped when the batch-type reactor is full and the formed positive electrode active material precursor particles are sedimented.

Referring to FIG. 2, the transition metal-containing solution, aqueous alkaline solution, and ammonium ion-containing solution may be continuously added to the batch-type reactor 100 to perform a reaction until the batch-type reactor 100 is almost filled. The expression "the batch-type reactor 100 is full" may denote that a volume of the added solutions is in a range of 95% to 100% of a volume of the batch-type reactor 100.

In this case, since the reaction is performed by increasing the addition rates of the solutions as described above, the reactor may be filled within time which is about 2 to 10 times faster than time typically required to fill the reactor.

After the addition of the solutions is stopped when the reactor 100 is filled as described above and the reaction is terminated, the formed solid, that is, positive electrode active material precursor particles are sedimented. When the positive electrode active material precursor particles are sedimented, stirring may be performed at 5 rpm to 50 rpm.

When the positive electrode active material precursor particles are sedimented, since stirring is not completely stopped but the stirring is performed at 5 rpm to 50 rpm, fine particles may be effectively removed without being sedimented and precursor particles having a more uniform particle size distribution may be prepared. Particularly, in a case in which a precursor having a concentration gradient is prepared, since a concentration gradient composition (e.g., Ni concentration difference between the center of the particle and the surface thereof) varies depending on the particle size, precursor particles having a uniform concentration gradient composition (e.g., precursor particles having a similar Ni concentration difference between the center of the particle and the surface thereof) may be finally secured by effectively removing the fine particles.

When the positive electrode active material precursor particles are sedimented as described above, a supernatant may be formed on the sediment.

Next, in step 3), the supernatant formed after the sedimentation of the positive electrode active material precursor particles is discharged to the outside.

After the supernatant is discharged as described above, the transition metal-containing solution, aqueous alkaline solution, and ammonium ion-containing solution are again added to an empty space of the batch-type reactor 100 to grow the positive electrode active material precursor particles, and thus, productivity may be improved.

As described above, in a case in which the addition rates of the solutions are increased, the supernatant is removed after the sedimentation of the formed positive electrode active material precursor particles, and the solutions are again added to grow the particles, more nucleus may be formed even if the same-sized reactor is used in the particle nucleation step because the addition rates of the solutions are fast, particles may further grow during the same reaction time because the particles are further grown by again adding the solutions after the removal of the supernatant in the subsequent particle growth step, and yield of the precursor particles may be significantly increased. Furthermore, since the transition metal cations of the transition metal-containing solution are crystallized during the formation of the positive electrode active material precursor particles when the reaction proceeds without the discharge of the supernatant, a ratio of a liquid component to the transition metal cations is increased. However, in the present invention, since the supernatant is removed and the transition metal-containing solution is again added, particles may be grown at a relatively high concentration of the transition metal cations. Also, since the fine particles already formed during the reaction may be removed during the removal of the supernatant, particle size control is easier and uniform precursor particles may be formed.

Next, in step 4), a pH, which has been reduced in the supernatant discharge process, is adjusted to 10 to 12 by adding the ammonium ion-containing solution after the removal of the supernatant.

After the removal of the supernatant, the transition metal-containing solution, aqueous alkaline solution, and ammonium ion-containing solution are again added to the batch-type reactor 100 to grow the positive electrode active material precursor particles, wherein, since the pH value is reduced during the removal of the supernatant, it is important to adjust the pH value by adding the ammonium ion-containing solution before reacting again. Since the pH value is reduced by about 0.3 to about 1.0 during the removal of the supernatant, the pH value may be adjusted to 10 to 12, for example, 10.5 to 11.5 by adding the ammonium ion-containing solution.

If the ammonium ion-containing solution is not added before the transition metal-containing solution, aqueous alkaline solution, and ammonium ion-containing solution are again added to perform a reaction after the removal of the supernatant, since the pH value is in a reduced state, the reaction is performed while an excessive amount of the aqueous alkaline solution is suddenly added to compensate for the reduced pH simultaneously at the beginning of the reaction, and thus, the particles are not preferentially grown, but fine particles may be formed due to the formation of new particle nucleus, the particle size distribution may be increased, and non-uniform precursor particles may be formed. Also, if the ammonium ion-containing solution is not added after the removal of the supernatant, the sedimented positive electrode active material precursor particles may not be well dispersed in the reaction solution during the stirring, but, if the ammonium ion-containing solution is added, the ammonium ion-containing solution may play a role in well dispersing the sedimented solids.

Next, in step 5), the positive electrode active material precursor particles are grown while the transition metal-containing solution, aqueous alkaline solution, and ammonium ion-containing solution are continuously again added to the batch-type reactor.

As described above, since the positive electrode active material precursor particles are grown by adding the transition metal-containing solution, aqueous alkaline solution, and ammonium ion-containing solution to the empty space of the reactor which is formed after the discharging of the supernatant, productivity may be improved, the particle size control may be easier, and uniform precursor particles may be prepared.

After step 5), the positive electrode active material precursor particles may be further grown by repeating step 2) to step 5).

In an embodiment of the present invention, when the solutions are added to the reactor at flow rates satisfying Equation 1, the reactor may be filled within time which is about 2 to 30 times, for example, about 2 to 10 times faster than time typically required to fill the reactor, more particle nucleus may be formed in the same-sized reactor, the particles may be more efficiently grown during the same reaction time when the process of removing the supernatant after the sedimentation of the subsequently formed positive electrode active material precursor particles and further growing the particles by again adding the solutions is repeated, and the yield of the precursor particles may be significantly increased.

The yield of the positive electrode active material precursor particles thus prepared may be improved by 100% to 3,000% in comparison to when a positive electrode active material precursor is prepared by using the same-sized batch-type reactor without the steps of sedimenting the positive electrode active material precursor particles and removing the supernatant. Specifically, the yield may be increased by about 100% every time the supernatant is removed once and the solutions are again added to grow the particles, based on yield of a positive electrode active material precursor when the positive electrode active material precursor is prepared without a process of removing the supernatant. That is, for example, when the removal of the supernatant and the addition of the solutions are repeated 5 times, the yield may be increased by 500%, and, when the removal of the supernatant and the addition of the solutions are repeated 10 times, the yield may be increased by 1,000%.

Also, the finally formed positive electrode active material precursor particles have a $(D_{90}-D_{10})/D_{50}$ of 1.2 or less, and thus, uniform particles may be formed.

Furthermore, the present invention provides a method of preparing a positive electrode active material through a step of sintering after mixing the positive electrode active material precursor thus prepared with a lithium-containing raw material.

For example, lithium carbonate ($Li_2CO_3$) or lithium hydroxide (LiOH) may be used as the lithium-containing raw material, and the positive electrode active material precursor and the lithium-containing raw material may be mixed in a molar ratio of 1:1 to 1:1.15. In a case in which the lithium-containing raw material is mixed in a ratio less than the above range, capacity of the prepared positive electrode active material may be reduced, and, in a case in which the lithium-containing raw material is mixed in a ratio greater than the above range, since particles are sintered during a sintering process, the preparation of the positive electrode active material may be difficult, the capacity may be reduced, and separation of the positive electrode active material particles (inducing positive electrode active material impregnation phenomenon) may occur after the sintering.

The sintering may be performed in a temperature range of 800° C. to 1,000° C. In a case in which the sintering temperature is less than 800° C., since the raw materials may remain in the particles due to an insufficient reaction, high-temperature stability of the battery may be reduced and structural stability may be reduced due to decreases in volume density and crystallinity. In a case in which the sintering temperature is greater than 1,000° C., non-uniform growth of the particles may occur, and, since a size of the particles is excessively increased to reduce an amount of the particles per unit area, volume capacity of the battery may be reduced. In consideration of the particle size control, capacity, and stability of the prepared positive electrode active material particles and a reduction in lithium-containing by-products, the sintering temperature, for example, may be in a range of 850° C. to 950° C.

The sintering may be performed for 5 hours to 35 hours. In a case in which the sintering time is less than 5 hours, since the sintering time is too short, it may be difficult to obtain a high crystalline positive electrode active material, and, in a case in which the sintering time is greater than 35 hours, the size of the particles may be excessively increased and production efficiency may be reduced.

The positive electrode active material thus prepared is a secondary particle formed by agglomeration of primary particles, and the primary particles have a columnar structure.

Specifically, the columnar-structured primary particles having an aspect ratio of greater than 1 may be agglomerated toward the center of the secondary particle to form the spherical secondary particle.

Also, a lithium secondary battery positive electrode may be prepared by including the above-described positive electrode active material.

Specifically, the positive electrode includes a positive electrode collector and a positive electrode active material layer which is disposed on at least one surface of the positive electrode collector and includes the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a conductive agent and a binder in addition to the above-described positive electrode active material.

In this case, the positive electrode active material may be included in an amount of 80 wt % to 99 wt %, for example, 85 wt % to 98 wt % based on a total weight of the positive electrode active material layer. When the positive electrode active material is included in an amount within the above range, excellent capacity characteristics may be obtained.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent in a solvent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Furthermore, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

The negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiALO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLE 1

$NiSO_4$, $CoSO_4$, and $MnSO_4$ were mixed in water in amounts such that a molar ratio of nickel:cobalt:manganese was 80:10:10 to prepare a transition metal-containing solution with a concentration of 2M. A container containing the transition metal-containing solution was connected to a 20 L batch-type reactor set at 60° C. In addition, a 25 wt % NaOH aqueous solution and a 15 wt % $NH_4OH$ aqueous solution were prepared and connected to the reactor, respectively.

4 L of deionized water was put in the batch-type reactor, the reactor was then purged with nitrogen gas at a rate of 2 L/min to remove dissolved oxygen in the water and create a non-oxidizing atmosphere in the reactor. Thereafter, 20 ml of a 50 wt % NaOH aqueous solution and 500 mL of a 15 wt % $NH_4OH$ aqueous solution were added, and stirring was then performed at a speed of 500 rpm and a temperature of 60° C. to maintain a pH at 12.0.

Subsequently, the transition metal-containing solution, the NaOH aqueous solution, and the $NH_4OH$ aqueous solution were respectively added at rates of 25 ml/min, 4 ml/min, and 5 ml/min and reacted for 30 minutes to form nucleus of nickel manganese cobalt-based composite metal hydroxide particles. Thereafter, while the pH was maintained at 11 to 12, the transition metal-containing solution, the NaOH aqueous solution, and the $NH_4OH$ aqueous solution were respectively added at rates of 25 ml/min, 4 ml/min, and 5 ml/min to induce growth of the nickel manganese cobalt-based composite metal hydroxide particles. Subsequently, the reaction was maintained for 8 hours to grow the nickel manganese cobalt-based composite metal hydroxide, and the reactor (20 L) was full.

Thereafter, the addition of the transition metal-containing solution, NaOH aqueous solution, and $NH_4OH$ aqueous solution was stopped, and, after the product was sedimented while stirring at 45 rpm, a supernatant was discharged to the outside.

After the discharge of the supernatant, 500 mL of a 15 wt % $NH_4OH$ aqueous solution was added so that the pH was 11.5. Thereafter, the transition metal-containing solution, the NaOH aqueous solution, and the $NH_4OH$ aqueous solution were again respectively added at rates of 25 ml/min, 4 ml/min, and 4 ml/min to induce the growth of the nickel manganese cobalt-based composite metal hydroxide particles while the pH was maintained at 11 to 12. After the removal of the supernatant, the particle growth process was repeated 5 times in total, and the resulting particles of the nickel manganese cobalt-based composite metal hydroxide were separated, washed, and then dried in an oven at 120° C. to prepare a $Ni_{0.8}Co_{0.1}Mn_{0.1}(OH)_2$ precursor.

EXAMPLE 2

As a transition metal-containing solution, $NiSO_4$, $CoSO_4$, and $MnSO_4$ were mixed in water in amounts such that a molar ratio of nickel:cobalt:manganese was 90:5:5 to prepare a first transition metal-containing solution with a concentration of 2M, and $NiSO_4$, $CoSO_4$, and $MnSO_4$ were mixed in water in amounts such that a molar ratio of nickel:cobalt:manganese was 50:25:25 to prepare a second transition metal-containing solution with a concentration of 2M. Containers containing the first and second transition metal-containing solutions were respectively connected to a static mixer, and a batch-type reactor (20 L) was connected to an outlet side of the static mixer. In addition, a 25 wt % NaOH aqueous solution and a 15 wt % NH$_4$OH aqueous solution were prepared and connected to the reactor, respectively.

4 L of deionized water was put in the batch-type reactor, the reactor was then purged with nitrogen gas at a rate of 5 L/min to remove dissolved oxygen in the water and create a non-oxidizing atmosphere in the reactor. Thereafter, 20 ml of a 50 wt % NaOH aqueous solution and 500 mL of a 15 wt % NH$_4$OH aqueous solution were added, and stirring was then performed at a speed of 500 rpm and a temperature of 60° C. to maintain a pH at 12.0.

Thereafter, a sum of addition rates of the first and second transition metal-containing solutions was allowed to be equal to the addition rate of the transition metal-containing solution of Example 1, but the first and second transition metal-containing solutions were added such that the addition rate of the first transition metal-containing solution was gradually reduced throughout the reaction and the addition rate of the second transition metal-containing solution was gradually increased throughout the reaction, and a precursor having an average composition of Ni$_{0.60}$Co$_{0.20}$Mn$_{0.20}$(OH)$_2$ and a concentration gradient, in which Ni was gradually decreased and Co and Mn were gradually increased from the center of the particle to the surface thereof, was prepared in the same manner as in Example 1 except that the precursor having a concentration gradient was prepared by performing the reaction while changing the concentration of nickel of the transition metal-containing solution added to the reactor through the static mixer, the pH, and the flow of the NaOH aqueous solution as listed in Table 1.

EXAMPLE 3

A precursor having an average composition of Ni$_{0.60}$Co$_{0.20}$Mn$_{0.20}$(OH)$_2$ and a concentration gradient, in which Ni was gradually decreased and Co and Mn were gradually increased from the center of the particle to the surface thereof, was prepared in the same manner as in Example 2 except that the precursor having a concentration gradient was prepared by performing the reaction while changing the concentration of nickel of the transition metal-containing solution added to the reactor through the static mixer, the pH, and the flow of the NaOH aqueous solution as listed in Table 1.

EXAMPLE 4

A precursor was prepared in the same manner as in Example 1 except that, after a product was sedimented while stirring at 10 rpm during the sedimentation of the product, a supernatant was discharged to the outside.

EXAMPLE 5

A precursor was prepared in the same manner as in Example 1 except that, after a product was sedimented while stirring at 50 rpm during the sedimentation of the product, a supernatant was discharged to the outside.

COMPARATIVE EXAMPLE 1

A precursor was prepared in the same manner as in Example 1 except that the transition metal-containing solution, NaOH aqueous solution, and NH$_4$OH aqueous solution were respectively added at rates of 5 ml/min, 1 ml/min, and 1 ml/min to maintain a reaction for 40 hours and grow a nickel manganese cobalt-based composite metal hydroxide until a reactor (20 L) was full, and processes of removing a supernatant and again inducing the growth of particles were not performed.

COMPARATIVE EXAMPLE 2

A precursor was prepared in the same manner as in Example 1 except that a product was sedimented while stirring was stopped during the sedimentation of the product, the NH$_4$OH aqueous solution was not added after the removal of a supernatant, and the transition metal-containing solution, NaOH aqueous solution, and NH$_4$OH aqueous solution were again added.

COMPARATIVE EXAMPLE 3

As a transition metal-containing solution, NiSO$_4$, CoSO$_4$, and MnSO$_4$ were mixed in water in amounts such that a molar ratio of nickel:cobalt:manganese was 90:5:5 to prepare a first transition metal-containing solution with a concentration of 2M, and NiSO$_4$, CoSO$_4$, and MnSO$_4$ were mixed in water in amounts such that a molar ratio of nickel:cobalt:manganese was 50:25:25 to prepare a second transition metal-containing solution with a concentration of 2M. Containers containing the first and second transition metal-containing solutions were respectively connected to a static mixer, and a batch-type reactor (20 L) was connected to an outlet side of the static mixer. In addition, a 25 wt % NaOH aqueous solution and a 15 wt % NH$_4$OH aqueous solution were prepared and connected to the reactor, respectively. A precursor having an average composition of Ni$_{0.60}$Co$_{0.20}$Mn$_{0.20}$(OH)$_2$ and a concentration gradient, in which Ni was gradually decreased and Co and Mn were gradually increased from the center of the particle to the surface thereof, was prepared in the same manner as in Comparative Example 1 except that the precursor having a concentration gradient was prepared by performing the reaction while changing the concentration of nickel of the transition metal-containing solution added to the reactor through the static mixer, the pH, and the flow of the NaOH aqueous solution as listed in Table 1.

TABLE 1

|  |  |  | 8 hours | 16 hours | 24 hours | 32 hours | 40 hours |
|---|---|---|---|---|---|---|---|
| Example 2 | $[Ni]_0$ = 90 mol % | $[Ni]_{t1}$, | 89 | 86 | 83.6 | 78 | 62 |
|  | $pH_0$ = 12.0 | $[Ni]_{t2}$ |  |  |  |  |  |
|  | $v_{2,0}$ = 20 | $pH_{t1}$ | 11.96 | 11.8 | 11.7 | 11.5 | 11 |
|  |  | $v_{2,t2}$ | 19.8 | 19.4 | 18.8 | 17.6 | 15.0 |

TABLE 1-continued

|  |  |  | 8 hours | 16 hours | 24 hours | 32 hours | 40 hours |
|---|---|---|---|---|---|---|---|
| Example 3 | $[Ni]_0 = 90$ mol % $pH_0 = 12.0$ | $[Ni]_{t1}$, $[Ni]_{t2}$ | 78 | 63 | 57 | 52 | 51 |
|  | $v_{2,0} = 20$ | $pH_{t1}$ | 11.7 | 11.4 | 11.2 | 11.0 | 10.8 |
|  |  | $v_{2,t2}$ | 18 | 15 | 14 | 13 | 12.5 |
| Comparative Example 3 | $[Ni]_0 = 90$ mol % $pH_0 = 11.8$ | $[Ni]_{t1}$, $[Ni]_{t2}$ | 89 | 86 | 83.6 | 78 | 62 |
|  | $v_{3,0} = 18.8$ | $pH_{t1}$ | 11.8 | 11.8 | 11.8 | 11.8 | 11.8 |
|  |  | $v_{2,t2}$ | 18.8 | 18.8 | 18.8 | 18.8 | 18.8 |

EXPERIMENTAL EXAMPLE: YIELD CHECK

In order to compare productivities of the positive electrode active material precursors prepared in Examples 1 to 5 and Comparative Examples 1 to 3, amounts of the precursors formed in Examples 1 to 5 and Comparative Examples 1 to 3 were measured. The results thereof are presented in Table 2.

TABLE 2

|  | Amount of precursor formed (g) | Ratio of improvement in yield based on typical yield (Comparative Example 1) (%) |
|---|---|---|
| Example 1 | 12,000 | 500 |
| Example 2 | 12,000 | 500 |
| Example 3 | 12,000 | 500 |
| Example 4 | 12,000 | 500 |
| Example 5 | 12,000 | 500 |
| Comparative Example 1 | 2,000 | 100 |
| Comparative Example 2 | 11,000 | 450 |
| Comparative Example 3 | 2,000 | 100 |

Referring to Table 2, with respect to Examples 1 to 5 in which the addition rates of the solutions were increased according to the embodiment of the present invention, the supernatant was removed when the reactor was full, and the process of growing the particles by again adding the solutions after the addition of the ammonium ion-containing solution was repeated, yields were significantly improved in comparison to those of Comparative Examples 1 and 3 even if the same-sized reactor was used during the same period of time. Also, the yields of Examples 1 to 5 were improved in comparison to that of Comparative Example 2 in which, after the removal of the supernatant, the pH was not adjusted to 10 to 12 by adding the NH$_4$OH aqueous solution.

EXPERIMENTAL EXAMPLE: PARTICLE SIZE DISTRIBUTION CHECK

In order to check particle size distributions of the positive electrode active material precursors prepared in Examples 1 to 5 and Comparative Examples 1 to 3, particle diameters of the precursors formed in Examples 1 to 5 and Comparative Examples 1 to 3 were measured using the Mastersizer 3000 by Malvern Instruments. The results thereof are presented in Table 3.

TABLE 3

|  | $D_{10}$ (μm) | $D_{50}$ (μm) | $D_{90}$ (μm) | $(D_{90} - D_{10})/D_{50}$ |
|---|---|---|---|---|
| Example 1 | 13 | 18.3 | 24.1 | 0.61 |
| Example 2 | 12.5 | 18.6 | 25.4 | 0.69 |
| Example 3 | 13.2 | 18.4 | 26.7 | 0.73 |
| Example 4 | 13.6 | 18.8 | 28 | 0.77 |
| Example 5 | 14 | 19.1 | 29.5 | 0.81 |
| Comparative Example 1 | 5 | 18 | 29 | 1.33 |
| Comparative Example 2 | 4 | 18 | 30 | 1.44 |
| Comparative Example 3 | 3.2 | 15.6 | 32.8 | 1.89 |

Referring to Table 3, with respect to Examples 1 to 5 in which the addition rates of the solutions were increased according to the embodiment of the present invention, the supernatant was removed when the reactor was full, and the particles were grown by again adding the solutions after the addition of the ammonium ion-containing solution, since Examples 1 to 5 showed narrower particle size distributions than Comparative Examples 1 and 3, it may be understood that more uniform precursors were formed. With respect to Comparative Example 2 in which the ammonium ion-containing solution was not added in the middle, since the reaction was performed by again adding the solutions in a state in which the pH value was reduced after the removal of the supernatant, the formation of particle nucleus was not suppressed. Thus, fine particles were formed, and it showed a very non-uniform particle size distribution.

The invention claimed is:

1. A method of preparing a positive electrode active material precursor for a lithium secondary battery by using a batch-type reactor, the method comprising:
   (1) forming positive electrode active material precursor particles while continuously adding a transition metal-containing solution including a transition metal cation, an aqueous alkaline solution, and an ammonium ion-containing solution to the batch-type reactor;
   (2) stopping the addition of the solutions when the batch-type reactor is full and sedimenting the positive electrode active material precursor particles formed;
   (3) discharging a supernatant formed after the sedimentation of the positive electrode active material precursor particles to an outside;
   (4) adjusting a pH, which has been reduced in the discharging of the supernatant, to 10 to 12 by adding the ammonium ion-containing solution; and
   (5) growing the positive electrode active material precursor particles while continuously again adding the transition metal-containing solution including a transition metal cation, the aqueous alkaline solution, and the ammonium ion-containing solution to the batch-type reactor.

2. The method of claim 1, wherein, in (3), when the positive electrode active material precursor particles are sedimented, stirring is performed at 5 rpm to 50 rpm.

3. The method of claim 1, wherein addition rates of the transition metal-containing solution, the aqueous alkaline solution, and the ammonium ion-containing solution in (1) satisfy Equation 1:

$$2(V-v)/t \leq \upsilon_1+\upsilon_2+\upsilon_3 \leq +(V-v)/t \quad \text{[Equation 1]}$$

wherein, in Equation 1, V is a volume (mL) of the batch-type reactor, v is a volume (mL) of the solution filled in the batch-type reactor before the continuous addition of the transition metal-containing solution, t is total reaction time (minutes), $\upsilon_1$ is an addition rate (mL/min) of the transition metal-containing solution, $\upsilon_2$ is an addition rate (mL/min) of the aqueous alkaline solution, and $\upsilon_3$ is an addition rate (mL/min) of the ammonium ion-containing solution.

4. The method of claim 1, wherein the ammonium ion-containing solution comprises at least one selected from the group consisting of $NH_4OH$, $(NH_4)_2SO_4$, $NH_4NO_3$, $NH_4Cl$, $CH_3COONH_4$, and $NH_4CO_3$.

5. The method of claim 1, wherein the forming of the positive electrode active material precursor particles in (1) comprises:
   (a) forming particle nucleus through a co-precipitation reaction at a pH of 11 to 13 by adjusting amounts of the aqueous alkaline solution and ammonium ion-containing solution added, and
   (b) after the forming of the nucleus, growing the particles through a co-precipitation reaction at a pH of 8 to 12 by adjusting amounts of the aqueous alkaline solution and ammonium ion-containing solution added.

6. The method of claim 1, wherein the transition metal-containing solution in (1) comprises a cation of at least one transition metal selected from the group consisting of nickel (Ni), manganese (Mn), and cobalt (Co).

7. The method of claim 1, wherein the transition metal-containing solution in (1) comprises a first transition metal-containing solution including cations of two or more transition metals and a second transition metal-containing solution including cations of two or more transition metals but having concentrations of the transition metal cations which are different from those of the first transition metal-containing solution.

8. The method of claim 7, wherein positive electrode active material precursor particles having a concentration gradient are formed by gradually decreasing an addition rate of the first transition metal-containing solution and gradually increasing an addition rate of the second transition metal-containing solution.

9. The method of claim 8, wherein, during the formation of the positive electrode active material precursor particles having a concentration gradient, a pH in the batch-type reactor satisfies Equation 2:

$$pH_0-([Ni]_0-[Ni]_{t1})\times 0.05 \leq pH_{t1} \leq pH_0-([Ni]_0'[Ni]_{t1})\times 0.005 \quad \text{[Equation 2]}$$

wherein, in Formula 2, $pH_{t1}$ is a pH in the reactor at time t1, $pH_0$ is an initial pH in the reactor, $[Ni]_0$ is a molar concentration of Ni in the transition metal-containing solution initially added, and $[Ni]_{t1}$ is a molar concentration of Ni in the transition metal-containing solution added at time t1.

10. The method of claim 9, wherein the pH in the batch-type reactor is controlled by an addition flow of the aqueous alkaline solution, and the addition flow of the aqueous alkaline solution satisfies Equation 3:

$$\upsilon_{2,0}\times\{1-(0.01\times([Ni]_0-[Ni]_{t2}))\} \leq \upsilon_{2,t2} < \upsilon_{2,0} \quad \text{[Equation 3]}$$

wherein, in Formula 3, $\upsilon_{2,t2}$ is an addition flow of the aqueous alkaline solution at time t2, $\upsilon_{2,0}$ is an initial addition flow of the aqueous alkaline solution, $[Ni]_0$ is a molar concentration of Ni in the transition metal-containing solution initially added, and $[Ni]_{t2}$ is a molar concentration of Ni in the transition metal-containing solution added at time t2.

11. The method of claim 1, wherein the aqueous alkaline solution comprises at least one selected from the group consisting of a hydrate of an alkali metal, a hydroxide of an alkali metal, a hydrate of an alkaline earth metal, and a hydroxide of an alkaline earth metal.

12. The method of claim 1, wherein, after (5), (2) to (5) are repeatedly performed.

13. The method of claim 1, wherein yield of the method of preparing a positive electrode active material precursor is improved by 100% to 3,000% in comparison to when a positive electrode active material precursor is prepared by using the same-sized batch-type reactor without sedimenting the positive electrode active material precursor particles and removing the supernatant.

14. The method of claim 1, wherein the finally formed positive electrode active material precursor particles have a $(D_{90}-D_{10})/D_{50}$ of 1.2 or less.

15. A method of preparing a positive electrode active material for a lithium secondary battery, the method comprising sintering after mixing the positive electrode active material precursor prepared according to any one of claim 1 with a lithium-containing raw material.

* * * * *